(12) United States Patent
Watanabe

(10) Patent No.: US 10,000,210 B2
(45) Date of Patent: Jun. 19, 2018

(54) LANE RECOGNITION APPARATUS

(71) Applicant: SUBARU CORPORATION, Tokyo (JP)

(72) Inventor: Akihiro Watanabe, Tokyo (JP)

(73) Assignee: SUBARU CORPORATEON, Tokyo (JP)

(*) Notice: Subject to any disclaimer, the term of this patent is extended or adjusted under 35 U.S.C. 154(b) by 0 days. days.

(21) Appl. No.: 15/215,180

(22) Filed: Jul. 20, 2016

(65) Prior Publication Data
US 2017/0043773 A1 Feb. 16, 2017

(30) Foreign Application Priority Data

Aug. 10, 2015 (JP) .................... 2015-158334

(51) Int. Cl.
*B60W 30/12* (2006.01)
*B60R 11/04* (2006.01)
(Continued)

(52) U.S. Cl.
CPC ............ *B60W 30/12* (2013.01); *B60R 11/04* (2013.01); *G06K 9/00798* (2013.01);
(Continued)

(58) Field of Classification Search
CPC ............ G06K 9/00798; G06K 9/6262; G06K 9/4604; B60R 11/04; G06T 2207/30256; B60W 50/14; B60W 30/12; G08G 1/167
See application file for complete search history.

(56) References Cited

U.S. PATENT DOCUMENTS 6,577,334 B1 6/2003 Kawai et al.
2005/0065721 A1 3/2005 Herrtwich et al.
(Continued)

FOREIGN PATENT DOCUMENTS

CN 103052976 A 4/2013
DE 19906614 A1 10/1999
(Continued)

OTHER PUBLICATIONS

Decision to Grant in Japanese Application No. 2015-158334 dated Feb. 7, 2017, with English translation.
(Continued)

*Primary Examiner* — Jason Holloway
(74) *Attorney, Agent, or Firm* — McDermott Will & Emery LLP

(57) ABSTRACT

A lane recognition apparatus includes a lane recognizer, a lane evaluator, and a recognition state monitor. The lane recognizer recognizes lane lines of a road on which a vehicle travels. The lane lines include a first lane line and a second lane line. The lane evaluator evaluates, as recognition reliability, reliability of the recognition of the lane lines recognized by the lane recognizer, based on a plurality of characteristic amounts that are obtained from the recognition of the lane lines. The recognition state monitor monitors, upon completion of the recognition of the first lane line following the evaluation on the recognition reliability, a state of the recognition of the second lane line to adjust a timing at which a result of the recognition of the lane lines is provided to a driver.

6 Claims, 3 Drawing Sheets

(51) Int. Cl.
  *G06K 9/00* (2006.01)
  *G06K 9/62* (2006.01)
  *G08G 1/16* (2006.01)
  *B60W 50/14* (2012.01)
  *G06K 9/46* (2006.01)

(52) U.S. Cl.
  CPC ........... *G06K 9/6262* (2013.01); *G08G 1/167* (2013.01); *B60W 50/14* (2013.01); *G06K 9/4604* (2013.01); *G06T 2207/30256* (2013.01)

(56) References Cited

U.S. PATENT DOCUMENTS

| | | | |
|---|---|---|---|
| 2005/0135658 A1* | 6/2005 | Yamamoto | G06K 9/00798 382/104 |
| 2008/0027627 A1* | 1/2008 | Ikeda | G06K 9/00798 701/117 |
| 2008/0192984 A1 | 8/2008 | Higuchi et al. | |
| 2010/0231718 A1* | 9/2010 | Nakamori | G06K 9/00798 348/148 |
| 2011/0169958 A1* | 7/2011 | Imai | B60W 30/12 348/149 |
| 2012/0194677 A1* | 8/2012 | Suzuki | G06K 9/00798 348/148 |
| 2012/0314055 A1 | 12/2012 | Kataoka | |
| 2015/0248588 A1* | 9/2015 | Ishigami | G06K 9/00798 382/104 |
| 2016/0304126 A1* | 10/2016 | Yamaoka | B62D 15/0255 |

FOREIGN PATENT DOCUMENTS

| | | |
|---|---|---|
| DE | 10344120 A1 | 4/2005 |
| EP | 1962254 B1 | 10/2015 |
| JP | 2002-175534 A | 6/2002 |
| JP | 2003-067755 A | 3/2003 |
| JP | 2007-125968 A | 5/2007 |
| JP | 2014-085842 A | 5/2014 |

OTHER PUBLICATIONS

Office Action issued in corresponding Chinese Patent Application No. 201610631592.6, dated Mar. 2, 2018.

Office Action issued in corresponding German Patent Application No. 10 2016 113 808.8, dated Apr. 20, 2018.

* cited by examiner

LANE RECOGNITION APPARATUS

CROSS-REFERENCE TO RELATED APPLICATIONS

The present application claims priority from Japanese Patent Application No. 2015-158334 filed on Aug. 10, 2015, the entire contents of which are hereby incorporated by reference.

BACKGROUND

The technology relates to a lane recognition apparatus that recognizes a lane of a road on which a vehicle travels and provides a driver with a result of the recognition of the lane.

In recent years, driving assistant systems for vehicles such as automobiles have been developed and put into practical use. Such a driving assistant system may recognize travelling environment around a vehicle by means of an on-board device such as a camera and radar, to assist a driver with driving operations, and to lessen an operation burden on a driver. Some driving assistant systems may have a function of recognizing a lane of a road on which an own vehicle travels, and performing a steering control and giving an alarm for purpose of lane keeping travelling and lane deviation prevention. The driving assistance system may also notify the driver of a state of lane recognition, a state of assistance control such as whether the assistance control is in operation or on standby, or any other information through screen displaying or a voice.

The lane recognition is often directed to lane lines on the road. For example, Japanese Unexamined Patent Application Publication (JP-A) No. 2007-125968 discloses a technique including a lane line recognizer that recognizes lane lines on a road surface on which a vehicle travels. In the technique disclosed in JP-A No. 2007-125968, lane lines on a screen are displayed in a daubing fashion when the lane line recognizer recognizes the lane lines on the road surface, and the lane lines on the screen are displayed in outline when the lane line recognizer does not recognize the lane lines on the road surface.

SUMMARY

In general, a process that recognizes lane lines as a lane requires a certain amount of time until the lane lines are recognized. One reason for this is that reliability of the recognized lane lines is evaluated to check whether a line pattern other than the lane lines, such as a pattern formed by the snow, is recognized erroneously.

Hence, existing cases may involve a difference in timing of recognizing a lane line between left and right lane lines when there is a difficulty in making a determination on the lane line. The difficulty may arise in a situation where, for example, positions at which the respective left and right lane lines are started to be drawn on a road surface are shifted from each other, or one of the left and the right lane lines is on the point of disappearing. This may cause the display timing of the left lane line and the display timing of the right lane line to be shifted from each other even though a driver is able to see the lane lines on the both sides, and may in turn give the driver a sense of discomfort.

It is desirable to provide a lane recognition apparatus that makes it possible to reduce variation in recognition of left and right lane lines and provide a driver with a result of the recognition of the lane lines without giving the driver a sense of discomfort.

An aspect of the technology provides a lane recognition apparatus that includes: a lane recognizer that recognizes lane lines of a road on which a vehicle travels, in which the lane lines include a first lane line and a second lane line; a lane evaluator that evaluates, as recognition reliability, reliability of the recognition of the lane lines recognized by the lane recognizer, based on a plurality of characteristic amounts that are obtained from the recognition of the lane lines; and a recognition state monitor that monitors, upon completion of the recognition of the first lane line following the evaluation on the recognition reliability, a state of the recognition of the second lane line to adjust a timing at which a result of the recognition of the lane lines is provided to a driver.

DETAILED DESCRIPTION

In the following, some implementations of the technology are described in detail with reference to the accompanying drawings.

Figure 1:
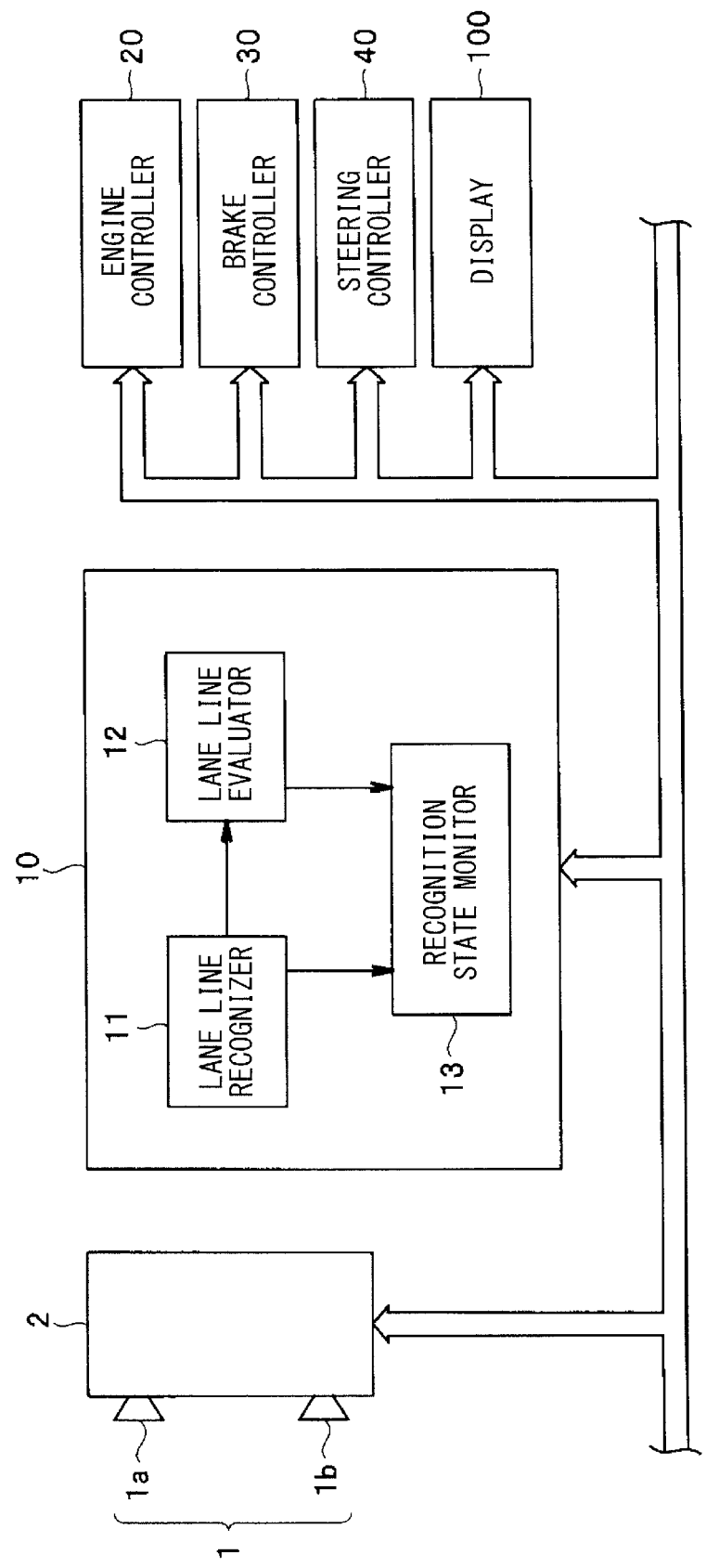
FIG. 1 illustrates an example of a configuration of a lane recognition apparatus.

Referring to FIG. 1, a lane recognition apparatus 10 may be mounted on a vehicle such as, but not limited to, an automobile, and recognizes a lane of a road on which the own vehicle travels. The lane recognition apparatus 10 may constitute a part of a driving assistant system that performs a driving assistant control for a driver. The driving assistant control may include, without limitation, lane deviation prevention, lane keeping, and automatic obstacle avoidance. The lane recognition apparatus 10 may output a result of the recognition of the lane to controllers that constitute the driving assistant system, and may provide the driver with information through a human machine interface (HMI). The controllers may include, without limitation, an engine controller 20 that controls an engine, a brake controller 30 that controls a brake, and a steering controller 40 that performs a steering control. The HMI may include, without limitation, a display 100. The information may include, without limitation, information on the recognized lane and information on a positional relationship between the lane and the own vehicle.

The lane recognition apparatus 10 may recognize the lane of the road on which the own vehicle travels, based on an image of a road surface captured by a camera, data on reflection obtained from the road surface by means of laser radar, and/or any other method. In one implementation, the lane recognition apparatus 10 may recognize the lane, based on an image captured by an on-board camera 1. The camera 1 may be a stereo camera configured by two cameras 1a and 1b that may capture respective images of a same object from different viewpoints. The cameras 1a and 1b may be synchronized in shutter with each other, and each may have an imaging device such as, but not limited to, CCD (charge coupled device) and CMOS (complementary metal oxide semiconductor). The cameras 1a and 1b may be so disposed at their respective positions as to have a predetermined baseline length. The positions may be near a rear-view mirror on inner side of a windshield, in an upper part of a vehicle interior.

The stereo image as a pair of right and left images captured by the cameras 1a and 1b may be processed by an image processor 2. The image processor 2 may obtain an amount of shift (i.e., a parallax) of pixels at corresponding positions in the respective right and left images by means of a stereo-matching process, and convert the thus-obtained pixel shift amount into luminance data or any other data to generate a distance image. The image processor 2 may convert, based on the principle of triangulation, any point in the distance image into a point defined by coordinates in real space, where a vehicle widthwise direction, i.e., a lateral direction of the own vehicle is an X axis, a vehicle heightwise direction is a Y axis, and a vehicle lengthwise direction, i.e., a distance direction is a Z axis. The image processor 2 may further output distance data thus obtained from the converted three-dimensional coordinates to devices including the lane recognition apparatus 10, the engine controller 20, the brake controller 30, and the steering controller 40.

The lane recognition apparatus 10 may recognize the lane of the road, based on the original images captured by the cameras 1a and 1b and the distance data outputted from the image processor 2. The lane recognition apparatus 10 may output, to the display 100, a result of the recognition of the lane at appropriate timing that is based on a state of the recognition of the lane, and thereby display the result of the recognition on the display 100. Hence, the lane recognition apparatus 10 may include a lane line recognizer 11, a lane line evaluator 12, and a recognition state monitor 13 as described below. In one implementation, the lane line recognizer 11 may serve as a "lane recognizer", and the lane line evaluator 12 may serve as a "lane evaluator".

The lane line recognizer 11 recognizes lane lines on the road, as the lane of the road along which the own vehicle travels. As used herein, the term "lane line" refers to, as a generic term, any line that extends on the road and defines a lane, regardless of whether the line is a solid line, a broken line, or any other patterned line. The term "lane line" as used herein also refers to a white line, a yellow line, or any other colored line. Further, even when the lane line present on the road is a double lane line or the like, such a double lane line or the like is approximated by and thus recognized as a single straight line or a single curve line for each of the lane lines on the right and left sides, in the recognition of the lane lines.

In one specific but non-limiting implementation, the lane line recognizer 11 may extract, from the image, a group of dots that may serve as a proposed lane line, and may calculate a straight line or a curve line that joins the proposed lane line dots together, to recognize the lane line. Alternatively, the lane line recognizer 11 may extract image elements that match with a characteristic of a lane line model prepared in advance, to recognize the lane line. In one implementation, the lane line recognizer 11 may evaluate a change in luminance in a widthwise direction of the road on an image plane, to extract the group of dots that may serve as the proposed lane line, and may perform processing on time-series data on the group of dots as the proposed lane line, to recognize the lane line.

In one specific but non-limiting implementation, the lane line recognizer 11 may detect an edge where luminance changes at a predetermined level or higher, along a plurality of search lines set horizontally (in the vehicle widthwise direction). In this way, the lane line recognizer 11 may detect a pair of a lane line starting point and a lane line ending point for each of the search lines, and may extract, as the proposed lane line dots, a region between the lane line starting point and the lane line ending point. Thereafter, the lane line recognizer 11 may perform processing on time-series data on three-dimensional coordinate positions of the proposed lane line dots based on an amount of movement of the vehicle per unit time. Thus, the lane line recognizer 11 may calculate a model that approximates the lane lines on the right and left sides, and may recognize the lane lines by means of the model. As the model that approximates the lane lines, an approximation model that couples together linear components obtained by Hough transformation, or a model approximated by a curve such as a quadratic function may be used.

The lane line evaluator 12 may perform an evaluation of recognition reliability as to whether line components obtained from the proposed lane line dots actually represent the lane lines (i.e., the lane) to determine, based on a result of the evaluation, whether the lane lines are recognized properly. By making the determination, the lane line evaluator 12 makes it possible to prevent any inconvenience in the driving assistant control attributed to the erroneous recognition from occurring. For example, when the snow is on the road surface and thus forms an unmelted snow zone over a predetermined section in a direction in which the vehicle travels, a line component that is based on an edge of the unmelted snow zone may possibly be recognized erroneously as the lane line. The unmelted snow zone may be, for example but not limited to, a wheel track on the snow or a lump of snow in a form of small mound. Such an erroneous recognition may possibly raise a concern in the driving assistant control.

Hence, the lane line evaluator 12 may evaluate, based on a plurality of characteristic amounts obtained from the image, the recognition reliability as to whether the obtained line components are the lane lines, to check whether a line pattern other than the lane lines is recognized erroneously. The line pattern other than the lane lines may include, without limitation, any pattern formed by the snow. Non-limiting examples of the characteristic amounts to be evaluated may include: a length of (i.e., the number of pixels in) a region from the lane line starting point to the lane line ending point; an edge intensity; luminance; a rate of the group of dots at the lane line starting point on the line components; a rate of the group of dots at the lane line ending point corresponding to the group of dots at the lane line starting point; and a height of the proposed lane line dots from the road surface. The lane line evaluator 12 may determine that the obtained line components are properly recognized as the lane lines when those characteristic amounts satisfy their respective predetermined thresholds.

The recognition state monitor 13 may monitor a state of the recognition of the lane lines recognized by the lane line recognizer 11 and the lane line evaluator 12, and adjusts a timing at which a result of the recognition is provided to the driver. In this implementation, without limitation, the recognition state monitor 13 may adjust a timing at which the result of the recognition is displayed on the display 100, as the timing at which the result of the recognition is provided to the driver.

Figure 2:
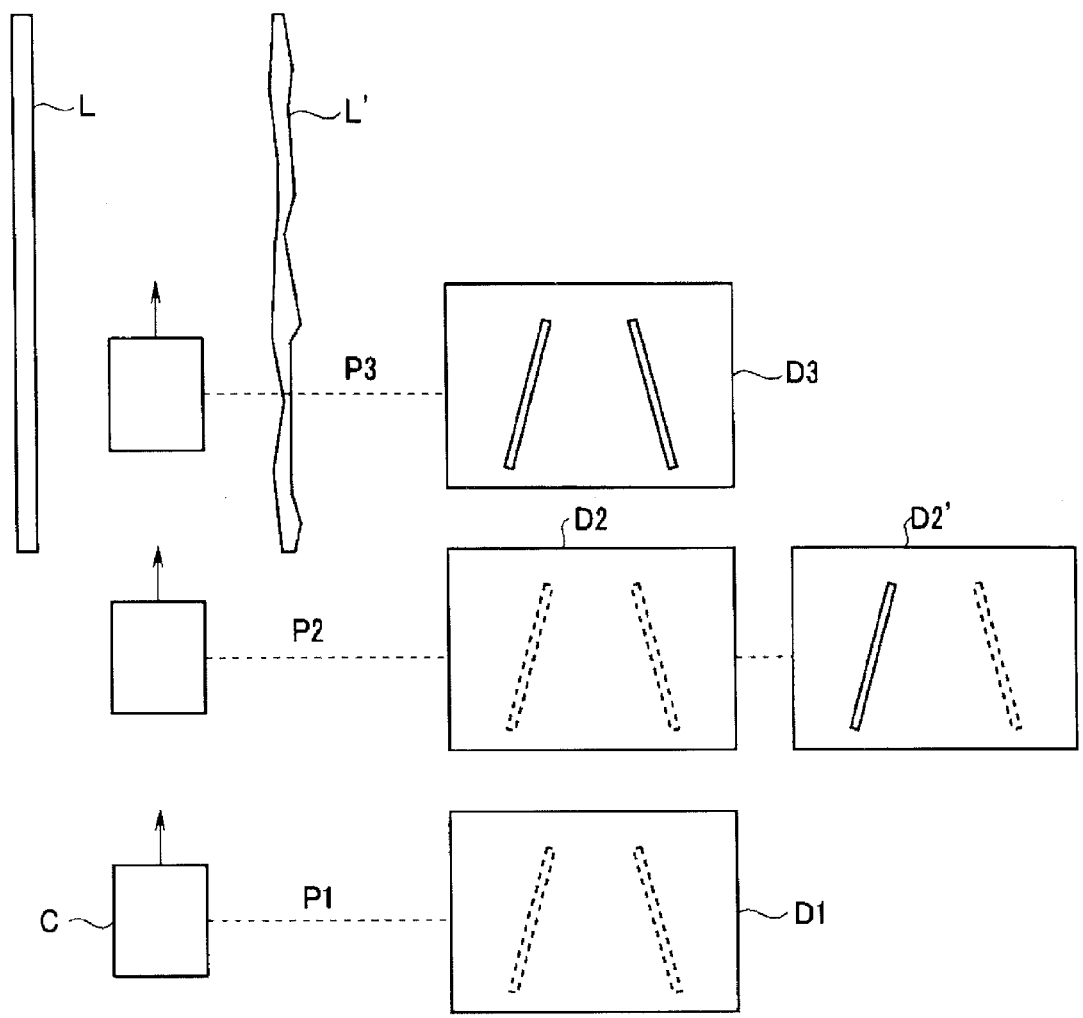
FIG. 2 describes a transition of displaying states of lane lines.

FIG. 2 illustrates an example in which a line segment L clearly recognizable as a lane line is present on one side of a road and a line segment L' is present on the other side of the road. The line segment L' may be unclear as the lane line due to unmelted snow or any other factor, or may not be the lane line. In this example, when an own vehicle C is at a position P1 that is before the line segments L and L' and does not detect the line segments L and L', no lane lines are displayed on a screen D1 of the display 100.

Thereafter, when the own vehicle C travels to reach a position P2, the line segment L on one side is detected and may be recognized properly as the lane line following the evaluation on the recognition reliability. However, even when a determination is made that the lane line is recognized properly, the recognition state monitor 13 may not cause the recognized line segment L on one side to be displayed at once as illustrated in a screen D2, and perform waiting for a predetermined time. When the line segment L' on the other side is detected at a position P3 before the predetermined waiting time elapses and is recognized properly as the lane line by means of the evaluation on the recognition reliability, the recognition state monitor 13 may then cause the left and the right line segments L and L' to be displayed as the lane lines as illustrated in a screen D3.

Here, in existing cases, only the line segment L on one side is displayed as the lane line as illustrated in a screen D2 even though the driver is able to see both the line segments L and L' at the position P2, and the line segments L and L' on the left and the right sides are displayed as the lane lines only after the own vehicle C has reached the position P3. This may give the driver an impression as if there is variation in recognition between the left and the right lane lines, and may in turn give the driver a sense of discomfort.

In contrast, in this implementation, upon completion of the recognition of one of the left and the right lane lines following the evaluation on the recognition reliability, the recognition state monitor 13 performs waiting for a predetermined time until the other lane line is recognized. When the other lane line is recognized during the waiting for the predetermined time, the recognition state monitor 13 may cause the left and the right lane lines to be displayed together by regarding the left and the right lane lines as being recognized together. When the predetermined waiting time is elapsed, the recognition state monitor 13 may cause only the lane line in which the recognition has been completed to be displayed. Hence, it is possible to prevent the driver from receiving the impression as if there is variation in recognition between the left and the right lane lines upon displaying those lane lines, and thereby to display the lane lines without involving a sense of discomfort.

In this case, performing the foregoing process every time even in a situation where, without limitation, the lane line is actually provided only on one side may make the process redundant and may result in a decrease in recognition rate accordingly. To address this concern, the recognition state monitor 13 may monitor the state of the recognition of one lane line on the opposite side of the other lane line and vice versa between the left and the right lane lines. Further, when the other lane line is recognizable as the lane line within a predetermined monitoring time, the recognition state monitor 13 may wait until that other lane line is recognized to cause the left and the right lane lines to be displayed together. However, the recognition state monitor 13 may cause only the lane line on one side to be displayed without performing the waiting for the predetermined monitoring time when it is known in advance that the lane line on the other side is not present or when it is found that it takes longer than the monitoring time to recognize the lane line on the other side. Hence, it is possible to reduce the variation in recognition between the left and the right lane lines while alleviating the decrease in the recognition rate.

Figure 3:
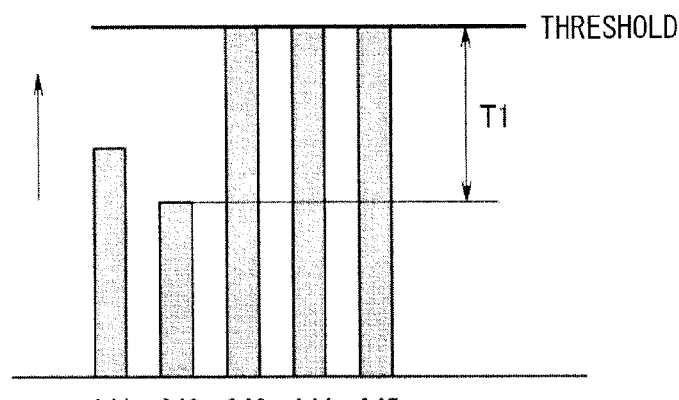
FIG. 3 describes reliability evaluation counters.

To perform the monitoring, the recognition state monitor 13 may include reliability evaluation counters as illustrated by way of example in FIG. 3 for the respective characteristic amounts M1, M2, M3, M4, M5, etc., that are subjected to the evaluation of the recognition reliability. The recognition state monitor 13 may use the reliability evaluation counters to measure a recognition completion time T1, and may compare the recognition completion time T1 with a monitoring time T2 to adjust the timing at which the lane lines are displayed. The recognition completion time T1 may be a time required to complete the recognition through the evaluation on the recognition reliability, i.e., a time required for all of the characteristic amounts to satisfy their respective thresholds.

In one specific but non-limiting example, the recognition state monitor 13 may estimate a time required for each of the evaluations on the respective characteristic amounts M1, M2, M3, M4, M5, etc., to be completed, based on a difference between the threshold of the time required to complete the evaluation and the reliability evaluation counter corresponding to that threshold. By making the estimation, the recognition state monitor 13 may determine the longest time required to complete the evaluation among those evaluations on the respective characteristic amounts as the recognition completion time T1 required to complete the recognition of the lane line. In one example illustrated in FIG. 3, the time required for the evaluation on the characteristic amount M2 to be completed corresponds to the recognition completion time T1.

Figure 4:
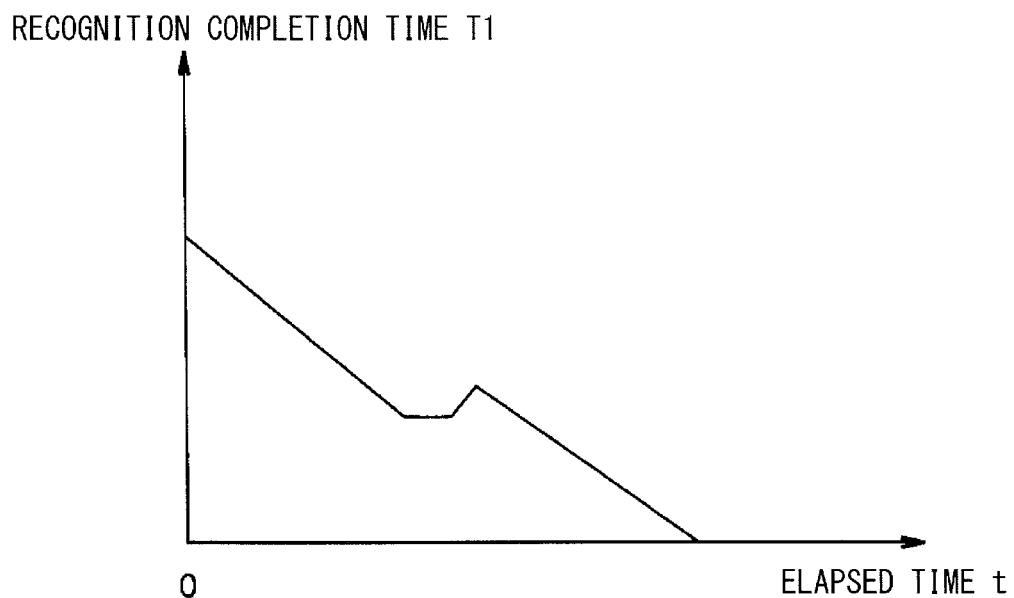
FIG. 4 describes time required to complete the evaluation.

In this case, a relationship of an elapsed time "t" from the completion of the recognition of the lane line on one side versus the recognition completion time T1 of the lane line on the other side may be as illustrated by way of example in FIG. 4. FIG. 4 illustrates that the recognition completion time T1 decreases with an increase in the elapsed time t. It is to be noted, however, that the recognition completion time T1 may not necessarily involve a monotonous decrease relative to the elapsed time t, and may involve an unproportional decrease locally.

Figure 5:
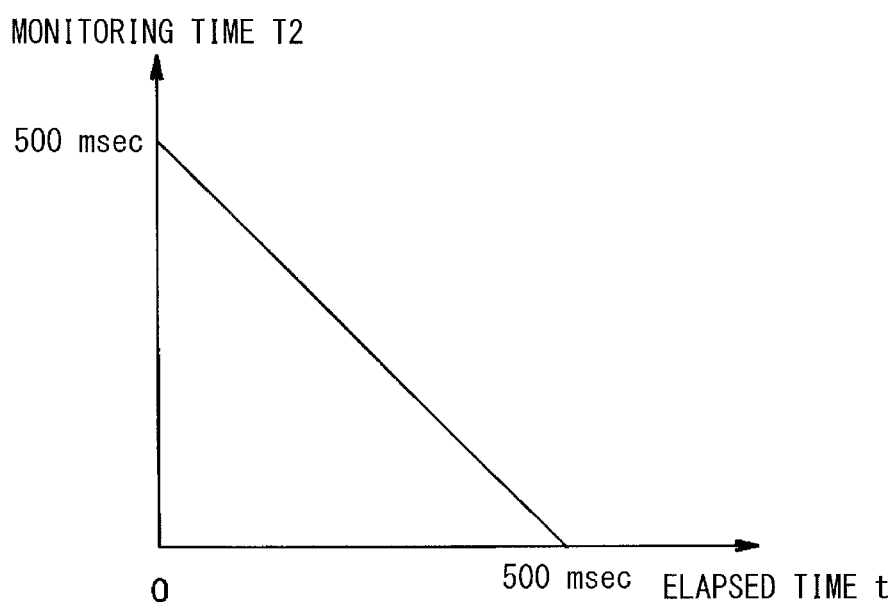
FIG. 5 describes monitoring time of a recognition state.

Further, the monitoring time T2 for the monitoring of the state of the recognition of the lane line on the other side when the lane line on one side is recognized may be varied in response to the elapsed time t from the completion of the recognition of the lane line on one side, which may bear a relationship as illustrated by way of example in FIG. 5. FIG. 5 illustrates a non-limiting example where a maximum value of the monitoring time T2 is set to 500 msec, and the monitoring time T2 equals to 500 msec when the elapsed time t is 0 (zero). In one example illustrated in FIG. 5, the monitoring time T2 is 0, i.e., the waiting finishes, when the elapsed time t reaches 500 msec.

The recognition state monitor 13 may make a comparison between the recognition completion time T1 and the monitoring time T2, and may adjust, based on a relationship in magnitude between the recognition completion time T1 and the monitoring time T2, the timing of displaying the lane lines in accordance with the following expressions (a) and (b).

$$T1<T2 \tag{a}$$

When the recognition completion time T1 is less than the monitoring time T2, a determination may be made that the evaluation on the recognition of the lane line on the other side is about to be completed, and thus the waiting may be performed until a result of the evaluation is obtained to decide the display timing of the lane lines.

$$T1 \geq T2 \tag{b}$$

When the recognition completion time T1 is equal to or greater than the monitoring time T2, a determination may be made, without limitation, that it takes time to perform the evaluation on the recognition of the lane line on the other side or that the lane line on the other side is not present, and thus only the already-recognized lane line on one side may be displayed without waiting for the result of the evaluation to be obtained.

In the recognition process of the left and the right lane lines according to the foregoing implementation, when the recognition of one of the left and the right lane lines is completed, the state of recognition of the other lane line is monitored to adjust the timing at which a result of the recognition of the lane lines is provided to the driver. This makes it possible to reduce the variation in recognition between the left and the right lane lines and to alleviate the decrease in the recognition rate. Hence, it is possible to provide the driver with a result of the recognition of the lane lines at a timing that substantially matches with a driver's sense without involving a sense of discomfort.

Although some implementations of the technology have been described in the foregoing by way of example with reference to the accompanying drawings, the technology is by no means limited to the implementations described above. It should be appreciated that modifications and alterations may be made by persons skilled in the art without departing from the scope as defined by the appended claims. The technology is intended to include such modifications and alterations in so far as they fall within the scope of the appended claims or the equivalents thereof.

The invention claimed is:

1. A lane recognition apparatus for a vehicle, comprising:
   one or more of a camera, laser, and radar, configured to obtain road surface information regarding a road on which the vehicle travels;
   one or more processors, configured to:
      recognize lane lines of the road on which the vehicle travels based on the obtained road surface information, the lane lines including a first lane line and a second lane line;
      separately determine whether the recognized first and second lane lines are reliably recognized, based on a plurality of characteristic amounts that are derived from the road surface information and correspond to characteristics of the respective first and second recognized lane lines; and
      after one of the first or second lane lines is determined to be reliably recognized, monitor a status of the determination of whether the other of the first and second lane lines is reliably recognized to adjust a timing at which a result of the recognition of both of the first and second lane lines is provided to a driver;
   a display, configured to display the recognized first and second lane lines based on the adjusted timing.

2. The lane recognition apparatus according to claim 1, wherein the one or more processors are further configured to estimate a recognition completion time of the determination of whether the other of the first and second lane lines is reliably recognized and compare the estimated recognition completion time with a monitoring time to adjust the timing at which the result of the recognition of both of the first and second lane lines is provided to the driver, the recognition completion time being a time required to complete the determination of whether the other of the first and second lane lines is reliably recognized, and the monitoring time being based on an elapsed time from the completion of the determination that the one of the first or second lane lines is reliably recognized.

3. The lane recognition apparatus according to claim 2, wherein the display is configured to:
   wait to display both of the recognized first and second lane lines until the determination of whether the other of the first and second lane lines is reliably recognized is completed, when the recognition completion time is less than the monitoring time, and
   display the one of the first or second lane lines determined to be reliably recognized without waiting for the determination of whether the other of the first and second lane lines is reliably recognized, when the recognition completion time is equal to or greater than the monitoring time.

4. The lane recognition apparatus according to claim 2, wherein the recognition completion time is estimated based on a difference between a reliability evaluation counter provided for each of the characteristic amounts and a threshold provided for each of the characteristic amounts.

5. The lane recognition apparatus according to claim 3, wherein the recognition completion time is estimated based on a difference between a reliability evaluation counter provided for each of the characteristic amounts and a threshold provided for each of the characteristic amounts.

6. The lane recognition apparatus according to claim 1, wherein the plurality of characteristic amounts for a recognized lane line of the first or second recognized lane lines include a two or more of the following:
   a length of a region in the obtained road surface information from a starting point of the recognized lane line to an ending point of the recognized lane line;
   an edge intensity of the recognized lane line;
   a luminance of the recognized lane line;
   a rate of a first group of dots in the obtained road surface information corresponding to the starting point of the recognized lane line;
   a rate of a second group of dots in the obtained road surface information corresponding to the ending point of the recognized lane line; and
   a height difference of the recognized lane line from the road surface.

* * * * *

UNITED STATES PATENT AND TRADEMARK OFFICE
CERTIFICATE OF CORRECTION

PATENT NO. : 10,000,210 B2
APPLICATION NO. : 15/215180
DATED : June 19, 2018
INVENTOR(S) : Akihiro Watanabe It is certified that error appears in the above-identified patent and that said Letters Patent is hereby corrected as shown below:

On the Title Page

Item "(73) Assignee:" should be changed from "SUBARU CORPORATEON" to --SUBARU CORPORATION--.

Signed and Sealed this
Second Day of October, 2018

Andrei Iancu
*Director of the United States Patent and Trademark Office*